United States Patent
Yamazaki et al.

(10) Patent No.: US 9,718,462 B2
(45) Date of Patent: Aug. 1, 2017

(54) HYBRID VEHICLE TRANSMISSION SHIFT MANAGEMENT SYSTEM AND METHOD

(71) Applicant: Ford Global Technologies, LLC, Dearborn, MI (US)

(72) Inventors: Mark Steven Yamazaki, Canton, MI (US); Zhengyu Dai, Canton, MI (US); Felix Nedorezov, Rochester Hills, MI (US); Rajit Johri, Ann Arbor, MI (US); Bernard D. Nefcy, Novi, MI (US); Wei Liang, Farmington Hills, MI (US); Xiaoyong Wang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 87 days.

(21) Appl. No.: 14/152,140

(22) Filed: Jan. 10, 2014

(65) Prior Publication Data
US 2015/0197242 A1 Jul. 16, 2015

(51) Int. Cl.
*B60W 20/30* (2016.01)
*B60W 10/10* (2012.01)
(Continued)

(52) U.S. Cl.
CPC ............ *B60W 20/30* (2013.01); *B60W 10/06* (2013.01); *B60W 10/08* (2013.01); *B60W 10/10* (2013.01); *B60W 10/11* (2013.01); *B60W 10/26* (2013.01); *F16H 61/0213* (2013.01); *F16H 61/10* (2013.01); *F16H 61/16* (2013.01); *B60W 2510/244* (2013.01); *B60Y 2200/92* (2013.01); *Y02T 10/6286* (2013.01); *Y10S 903/93* (2013.01)

(58) Field of Classification Search
CPC ...... B60W 20/30; B60W 10/10; B60W 10/08; B60W 10/06; B60W 10/26
USPC .................................. 701/51–56, 22; 477/34
See application file for complete search history.

(56) References Cited

U.S. PATENT DOCUMENTS 5,929,604 A * 7/1999 Irvin ............................ 320/136
6,962,550 B2 11/2005 Kadota
(Continued)

FOREIGN PATENT DOCUMENTS

EP          1356972 A1    10/2003
WO    WO 2013030881 A1 *  3/2013

*Primary Examiner* — Genna Mott
(74) *Attorney, Agent, or Firm* — David B. Kelley; Brooks Kushman P.C.

(57) ABSTRACT

A vehicle is provided with a powertrain including a battery-powered electric motor, an internal combustion engine, a transmission, and a powertrain controller. The controller is programmed to permit an upshift of a transmission gear ratio while a powertrain torque demand is less than a forecasted available powertrain torque sustainable over a predetermined upcoming duration of time. The controller is also programmed to inhibit an upshift while the torque demand exceeds the forecasted available powertrain torque to reduce successive gear shifts. The controller may be further programmed to, in response to battery a state of charge being less than a threshold, reduce the forecasted available powertrain torque by an amount sufficient to provide a recharge to a battery. The controller may be further still programmed to reduce the forecasted available powertrain torque by an amount sufficient to restart the engine while the powertrain is operating in an engine-off traction mode.

12 Claims, 5 Drawing Sheets

(51) Int. Cl.

| | | |
|---|---|---|
| *B60W 10/26* | (2006.01) | |
| *B60W 10/08* | (2006.01) | |
| *B60W 10/06* | (2006.01) | |
| *B60W 10/11* | (2012.01) | |
| *F16H 61/02* | (2006.01) | |
| *F16H 61/10* | (2006.01) | |
| *F16H 61/16* | (2006.01) | |

(56) References Cited

U.S. PATENT DOCUMENTS

| | | |
|---|---|---|
| 8,617,028 B2 | 12/2013 | Kresse et al. |
| 2003/0006076 A1* | 1/2003 | Tamor .......................... 180/65.2 |
| 2003/0158645 A1* | 8/2003 | Czarnecki et al. ............. 701/51 |
| 2004/0009842 A1* | 1/2004 | Inada ................................ 477/5 |
| 2007/0056783 A1* | 3/2007 | Joe et al. ..................... 180/65.2 |
| 2007/0135257 A1* | 6/2007 | Bissontz ........................... 477/5 |
| 2009/0118089 A1* | 5/2009 | Heap ..................... B60K 6/365 |
| | | 477/97 |
| 2009/0234549 A1* | 9/2009 | Silveri et al. .................. 701/70 |
| 2013/0109534 A1 | 5/2013 | Probert et al. |
| 2014/0166379 A1* | 6/2014 | Kimura et al. ............ 180/65.21 |

\* cited by examiner

HYBRID VEHICLE TRANSMISSION SHIFT MANAGEMENT SYSTEM AND METHOD

TECHNICAL FIELD

The present disclosure relates to hybrid vehicles, more specifically powertrain control systems.

BACKGROUND

Automatic transmissions are commonly used automotive applications as a driver convenience feature. In many transmissions, a single shift schedule map is used to determine points when the transmission is shifted from one gear to another. The shift schedule is predetermined and may be optimized for fuel economy and performance for a certain vehicle load and with acceptable drivability. The shift points are a typically a function of throttle position and vehicle speed, and do not take into consideration the load on the vehicle. It is known to provide a towing or hauling switch, which may invoke an alternate shift schedule. Again, this towing schedule is pre-programmed and hence is not a function of the actual load on the vehicle, nor is it able to be dynamically updated based on other changes in operating conditions.

During operation of an automatic transmission, a cycle can occur during which the transmission upshifts automatically, vehicle speed slows, and then the transmission downshifts automatically. The reduction in speed may result from increased loads or a decrease in powertrain available power. This is cycle is sometimes referred to as powertrain hunting. The rapid succession of gear shifts may be unexpected, and can detract driver satisfaction.

SUMMARY

A vehicle is provided with a powertrain including a battery-powered electric motor, an internal combustion engine, a transmission, and a powertrain controller. The controller is programmed to permit an upshift of a transmission gear ratio while a powertrain torque demand is less than a forecasted available powertrain torque sustainable over a predetermined upcoming duration of time. Additionally, the controller is programmed to inhibit an upshift of the gear ratio while the torque demand exceeds the forecasted available powertrain torque to reduce successive gear shifts.

A method of scheduling hybrid vehicle transmission gear shifts includes receiving signals indicative of a driver torque demand and a vehicle speed, and receiving a signal indicative of energy available from a traction battery over an upcoming predetermined duration of time. The method further includes forecasting a maximum available powertrain torque that is sustainable over the duration of time based on the torque demand, the vehicle speed, and the energy available from the battery. The method further still includes comparing the maximum available powertrain torque to a schedule of a series of upshift thresholds, and permitting an upshift command to a transmission in response to the driver torque demand while the forecasted available powertrain torque exceeds the driver torque demand.

A hybrid-electric vehicle is provided with a powertrain including a battery-powered motor, an internal combustion engine, a transmission, and a controller. The controller is programmed to permit an upshift command for the transmission in response to an acceleration demand while a forecasted available powertrain torque available over a predetermined upcoming period of time exceeds a stored upshift threshold to reduce an overall number of gear ratio shifts.

The controller may be further programmed to, in response to a state of charge of the battery being less than a first threshold, reduce the forecasted available powertrain torque by an amount sufficient to provide a recharge to a battery.

The controller may be further still programmed to reduce the forecasted available powertrain torque by an amount sufficient to restart the engine while the powertrain is operating in an engine-off traction mode.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
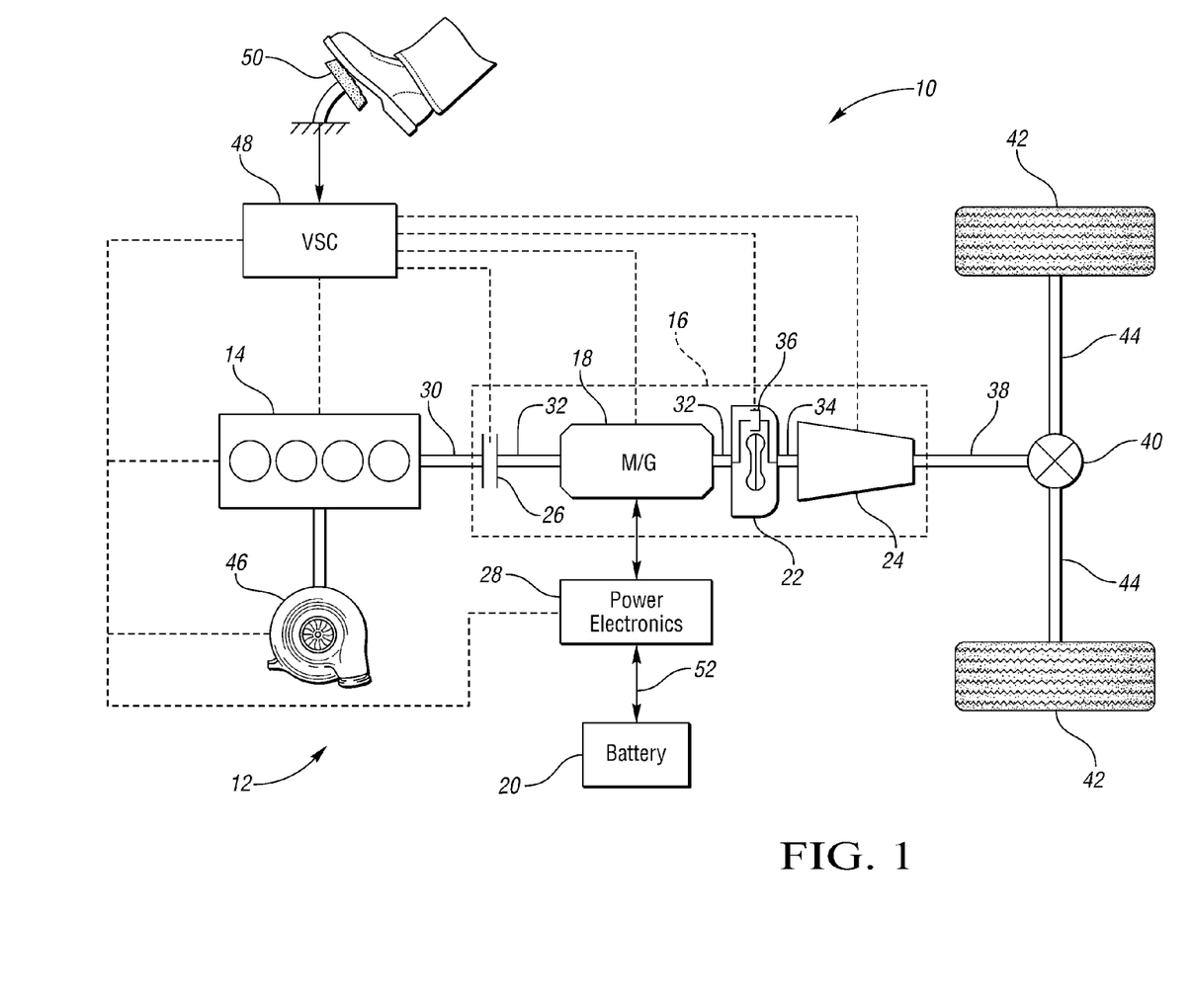
FIG. 1 is a schematic of a hybrid electric vehicle.

Referring to FIG. 1, a schematic diagram of a hybrid-electric vehicle (HEV) 10 illustrates representative relationships among the components of the vehicle. Physical placement and orientation of the components within the vehicle may vary. The vehicle 10 includes a powertrain 12, having an engine 14 that drives a transmission 16. As will be described in further detail below, the transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both capable of providing motive power for the HEV 10. The engine 14 generally represents a power source which may include an internal combustion engine such as a gasoline, diesel, or natural gas powered engine, or a fuel cell. The engine 14 generates an engine power and corresponding output torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous battery-powered electric motor. Power electronics 28 condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, when the disconnect clutch 26 is engaged, the M/G 18 may operate as a generator to convert rotational energy provided by a crankshaft 30 through M/G shaft 32 into electrical energy to be stored in the battery 20. In this mode of operation, the M/G 18 imparts a torque load upon the engine. The disconnect clutch 26 can also be disengaged to isolate the engine 14 from the remainder of the powertrain 12 such that the M/G 18 can operate as the sole drive source for the vehicle 10. Shaft 32 extends through the M/G 18. The M/G 18 is continuously drivably connected to the shaft 32, whereas the engine 14 is drivably connected to the shaft 32 only when the disconnect clutch 26 is at least partially engaged.

The M/G 18 is also connected to the torque converter 22 via shaft 30. Therefore the torque converter 22 is also connected to the engine 14 when the disconnect clutch 26 is at least partially engaged. The torque converter 22 includes an impeller fixed to the M/G shaft 32 and a turbine fixed to a transmission input shaft 34. The torque converter 22 provides a hydraulic coupling between shaft 32 and transmission input shaft 34. A torque converter bypass clutch 36 may also be provided that, when engaged, frictionally or mechanically couples the impeller and the turbine of the torque converter 22, permitting more efficient power transfer. The torque converter bypass clutch 36 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 36. In some applications, disconnect clutch 26 is generally referred to as an upstream clutch and launch clutch 36 (which may be a torque converter bypass clutch) is generally referred to as a downstream clutch.

The transmission gearbox 24 may include gear sets (not shown) that are selectively placed in different gear ratios by selective engagement of friction elements such as clutches and brakes (not shown) to establish the desired multiple discrete or step drive ratios. The friction elements are controllable through a gear shift schedule that connects and disconnects certain elements of the gear sets to control the torque and/or speed ratio between a transmission output shaft 38 and the transmission input shaft 34. The gearbox 24 ultimately provides a powertrain output torque to output shaft 38.

It should be understood that the hydraulically controlled gearbox 24 combined with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As further shown in the representative schematic of FIG. 1, the output shaft 38 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The engine 14 may also be coupled to a turbocharger 46 to provide an air intake pressure increase, or "boost" to force a higher volume of air into a combustion chamber of the engine 14. The pressure boost generally refers to the amount by which intake manifold pressure exceeds atmospheric pressure. The boost is further representative of the extra air pressure that is achieved over what would be achieved without forced induction. Related to the increased air pressure provided to the engine 14 by the turbocharger 46, a corresponding increase in the rate of fuel combustion may be achieved. The additional air pressure boost therefore allows the engine 14 to achieve additional output power, thereby increasing engine torque.

Operation states of the powertrain 12 may be dictated by a controller, such as a powertrain control unit (PCU). While illustrated as a single controller, the PCU may be part of a larger control system and may be influenced by various other controllers throughout the vehicle 10, such as a vehicle system controller (VSC) 48. Examples of such other controllers included within the VSC 48 include a brake system control module (BSCM), a high voltage battery controller (BECM), as well as other controllers in communication which are responsible for various vehicle functions. The one or more other controllers can collectively be referred to as a "controller" that commands various actuators in response to signals from various sensors. The VSC 48 response may serve to dictate or influence a number of vehicle functions such as starting/stopping engine 14, operating the M/G 18 to provide wheel torque or recharge the traction battery 20, select or schedule vehicle transmission gear shifts, etc. The VSC 48 may further include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or nonvolatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The VSC 48 communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, the VSC 48 may communicate signals to and/or from the engine 14, the turbocharger 46, the disconnect clutch 26, the M/G 18, the launch clutch 36, the transmission gearbox 24, and the power electronics 28. Although not explicitly illustrated, those of ordinary skill in the art will recognize various functions or components that may be controlled by the VSC 48 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 36, and transmission gearbox 24, and the like. Sensors communicating input through the I/O interface may be used to indicate turbocharger boost pressure, turbocharger rotation speed, crankshaft position, engine rotational speed (RPM), wheel speeds, vehicle speed, engine coolant temperature, intake manifold pressure, accelerator pedal position, ignition switch position, throttle valve position, air temperature, exhaust gas oxygen or other exhaust gas component concentration or presence, intake air flow, transmission gear, ratio, or mode, transmission oil temperature, transmission turbine speed, torque converter bypass clutch 36 status, deceleration or shift mode, for example.

A driver of the vehicle 10 may provide input at accelerator pedal 50 and create a demanded torque, power, or drive command to propel the vehicle 10. In general, depressing and releasing the pedal 50 generates an accelerator input signal that may be interpreted by the VSC 48 as a demand for increased power or decreased power, respectively. Based at least upon input from an accelerator pedal 50, the controller 48 may allocate torque commands between each of the engine 14 and/or the M/G 18 to satisfy the torque demanded by the driver. The VSC 48 also includes a torque control logic feature, capable of interpreting driver requests and responding based on the particular vehicle operating conditions. These conditions may include, for example, gear selection (PRNDL), accelerator pedal inputs, battery temperature, voltage, current, and battery state of charge (SOC).

As mentioned above, the VSC 48 may be programmed to control the timing of gear shifts within the gearbox 24, as well as engagement or disengagement of the disconnect clutch 26 and the torque converter bypass clutch 36. The VSC 48 is capable of issuing a gear select command signal to the transmission gear box based on a derived torque demand. Like the disconnect clutch 26, the torque converter bypass clutch 36 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 36 may be operated as locked or open without using a modulated operating mode depending on the particular application.

The SOC of the traction battery 20 is an indicator of the amount of charge of the battery, and consequently may be used, at least in part, to determine the energy available from the battery. SOC is a derived value and can be expressed as a percentage of the charge capacity of the battery. It could be analogous to a fuel gage of the battery. For example, 100% SOC may be fully charged, and 0% may be fully discharged. As the SOC drops during discharge, the voltage provided by the battery also reduces. It may be desirable to limit the depth of discharge and provide a recharge to the battery prior to the SOC dropping below a critical threshold. This may help to maintain the battery cells and extend the life of the battery.

To drive the vehicle with the engine 14 as the motive power, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may provide a torque assist to the engine 14 by delivering additional powered torque to turn the shaft 32. This operation mode may be referred to as a "hybrid mode" or an "electric assist mode."

To drive the vehicle 10 with the M/G 18 as the sole power source, the power flow remains the same except the disconnect clutch 26 isolates the engine 14 from the remainder of the powertrain 12. Combustion in the engine 14 may be disabled or otherwise OFF during this time in order to conserve fuel, for example. The traction battery 20 transmits stored electrical energy through wiring 52 to power electronics 28 that may include an inverter, as well as a DC/DC converter. The power electronics 28 may convert high-voltage direct current from the battery 20 into alternating current for use by the M/G 18. Additionally, the power electronics may adjust the high-voltage to a lower voltage suitable for use by other vehicle components. The VSC 48 may further issue commands to the power electronics 28 such that the M/G 18 is enabled to provide positive or negative torque to the shaft 32. This operation mode may be referred to as an "engine-off" traction mode of operation.

Alternatively, the M/G 18 may operate in a generator mode to convert kinetic energy from the powertrain 12 into electric energy to be stored in the battery 20. The M/G 18 may act as a generator while the engine 14 is providing the sole propulsion power for the vehicle 10, for example. The engine torque output through shaft 32 when imparted on the M/G 18 applies a torque load upon the engine 14. This may in turn reduce available overall torque output. The M/G 18 may additionally act as a generator during times of regenerative braking in which rotational energy from spinning wheels 42 is transferred back through the gearbox 24 and is converted into electrical energy for storage in the battery 20. In this way the torque load from the M/G 18 serving as a generator may contribute to slowing down the vehicle.

It should be understood that the schematic illustrated in FIG. 1 is merely exemplary and is not intended to be limiting. Other configurations are contemplated that utilize selective engagement of both an engine and a motor to transmit through a transmission. For example, the M/G 18 may be offset from the crankshaft 30, an additional motor may be provided to start the engine 14, and/or the M/G 18 may be provided between the torque converter 22 and the gearbox 24. Other configurations are contemplated without deviating from the scope of the present disclosure.

The timing of shifts between various transmission gear ratios may be determined using a stored schedule of shift thresholds. The shift thresholds may be based at least on transmission output shaft rotation speed (RPM) and the acceleration demand. A series of RPM and torque combinations may comprise a threshold profile across vehicle operating conditions. Upshift and downshift threshold profiles exist for shifts into, as well as out of, available gear ratios.

The VSC may be configured to inhibit transmission upshifts to a higher gear if the upshift would prevent vehicle acceleration in the higher gear. For example, if there is a power drop-off related to battery and/or motor power depletion, vehicle speed may decrease and cause a successive downshift. Implementation of strategies described in this disclosure may be employed to avoid an upshift to a higher gear, a drop in available powertrain torque, and a subsequent downshift to a lower gear, each in rapid succession. In this way, unnecessary successive gear shifts may be reduced or avoided.

Related to the transient nature of power delivery by the electric motor, a prediction or forecast can be made of the amount of torque which is sustainable over a predetermined upcoming duration of time. Torque from the motor is achieved through delivery of high-voltage electricity from the traction battery. As the battery energy is depleted, the available power may be reduced along with motor output torque. The controller may use dynamic parameters of the electrical system to derive a forecasted power available from the battery over a predetermined upcoming period of time. In certain embodiments, the cumulative amount of energy available from the battery is used in the motor torque forecast. Alternatively, the forecast may include determining an instantaneous motor torque available after the predetermined amount of time. The motor torque forecast takes into account the capabilities of both the high voltage battery and the motor.

In order to facilitate shift scheduling, the VSC stores a table of threshold maximum transmission output torque available for a range of transmission input speeds. The VSC further calculates the available powertrain torque over an upcoming period of time. The prediction accounts for several factors unique to hybrid vehicles. Engine-on and engine-off modes of operation, as well as various conditions of the SOC of the battery, can each influence the amount of powertrain torque available over the upcoming time duration. Therefore adjustments to the forecasted torque value can be used for comparison to the upshift schedule to account for various vehicle operating conditions.

The calculation of the forecasted power may occur within the power electronics, or alternatively be performed by a processor which is part of the traction battery assembly. The power electronics may send a request indicating the period of time to forecast, and the battery processor may return a value representative of the energy that the battery is able to deliver over the requested time period. The motor torque available may then be derived from the forecasted available battery energy.

The engine torque may also be predicted over the upcoming time period. A periodic "ping" may be issued to query the available engine torque. For example, the sample rate of the ping may be about 100 ms. The VSC can then take the current torque output and derive a forecasted output considering a driver's acceleration demand. Generally, the predicted engine torque may be combined with predicted motor torque to determine a predicted overall powertrain torque.

There are several other factors which can play into an accurate forecast of upcoming sustainable powertrain torque. For example, when the vehicle is operating in an engine-off mode, a portion of the motor torque output may be reserved which is sufficient to restart the engine. In this way, the restart torque is subtracted from the available sustainable powertrain torque calculation, and is unavailable to use for shift scheduling. This adjustment avoids a scenario where an upshift occurs, then battery SOC is depleted such that it causes a need to restart the engine, and the torque required to restart the motor causes a downshift, all in rapid succession.

Another vehicle operating condition that benefits from the strategies of this disclosure is an engine-on mode of operation where there is a low SOC. If the SOC is below a predetermined threshold, the motor may be switched into generator mode and thereby impart a negative torque on the engine in order to recharge the battery. In this way, sufficient engine torque may be reserved to accommodate the recharge. The torque required to recharge the battery is subtracted from the predicted available sustainable torque calculation and is unavailable to use for shift scheduling. This adjustment avoids a scenario where an upshift occurs, the motor is switched off due to a low SOC, and then a downshift is invoked, all in rapid succession.

A further vehicle operating condition that benefits from the strategies disclosed herein is an engine-on mode of operation where there is a high SOC. In this case, the vehicle may enter a motor assist mode as discussed above. The VSC may then account for increased available powertrain torque provided by the motor. The assist torque is added to the available torque calculation and becomes available to use for shift scheduling. The additional torque may provide for a wider range of sustainable upshifts, increasing vehicle acceleration capability.

In any scenario where the battery-powered motor is used as a motive source, electrical losses can detract from available motor torque. Such loss may stem from a number of sources. For example loss related to the efficiency of the motor itself, DC/DC voltage step down, DC/AC conversion each may detract from available engine power. Additionally vehicle electrical loads drawing upon the high-voltage traction battery may further contribute to electrical loss. Ultimately, electrical loss can be accounted for in the available torque prediction by subtracting the sum of electrical losses from the predicted motor torque.

The final adjusted forecasted available powertrain torque which is sustainable over the upcoming time period may be used to compare to the transmission shift schedule. The VSC may permit an upshift command to increase transmission gear ratio while the powertrain torque demanded from the driver is less than the forecasted available powertrain torque. An appropriate time period is used such that shifting does not occur too frequently, and detract from customer drive satisfaction. By way of example, a forecast period of 10 seconds may operate to provide smooth gear shifting during drive events.

Figure 2:
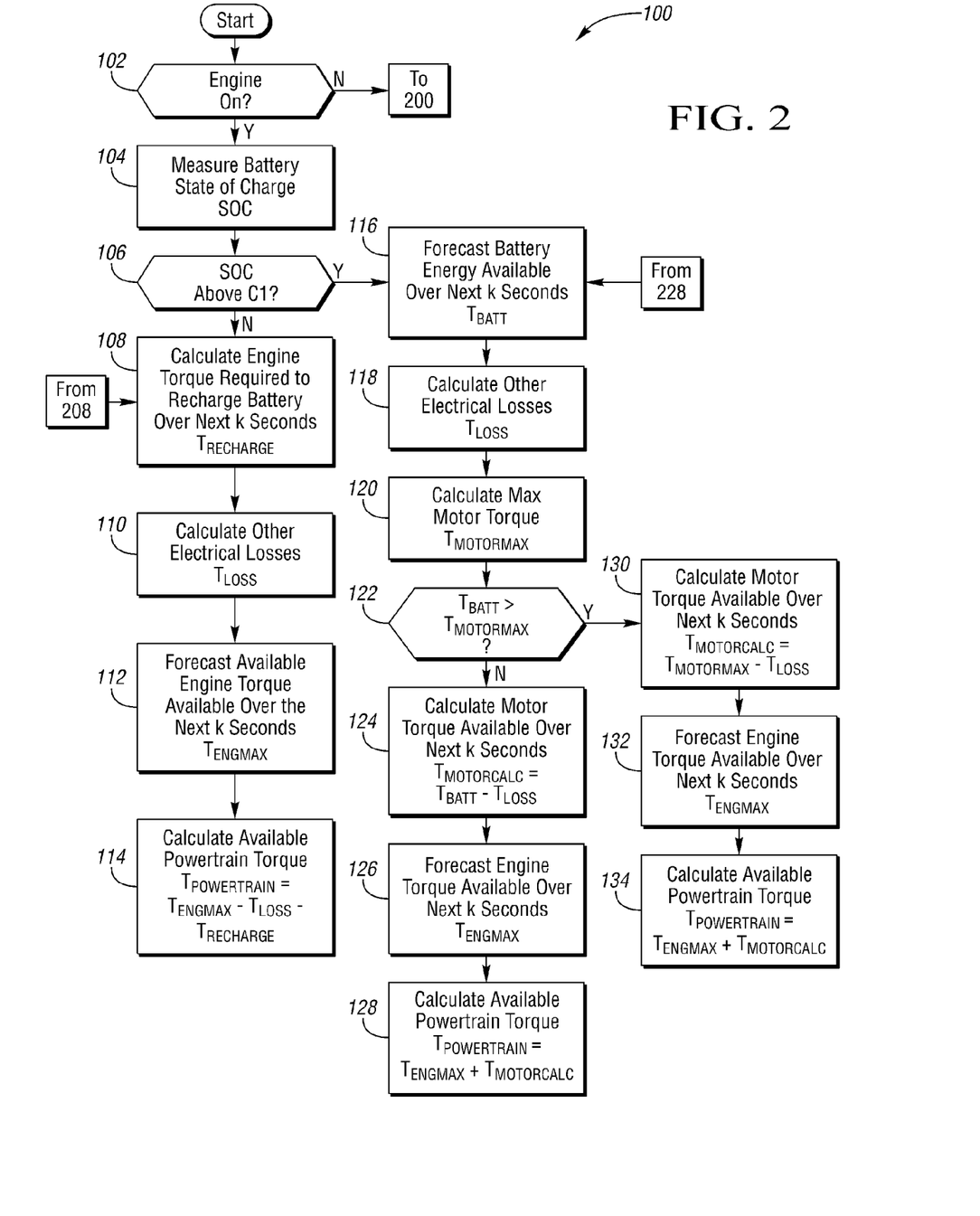
FIG. 2 is a flowchart corresponding to a method of forecasting sustainable powertrain torque in an engine-on mode of operation.

FIG. 2 depicts a method 100 of controlling gear ratio shift timing. Step 102 includes a determination of whether the vehicle is in an engine-on, or an engine-off mode of operation. If the vehicle is operating in an engine-on mode, step 104 includes receiving a signal indicative of a state of charge (SOC) of the battery. At step 106, a determination is made of whether or not the SOC is above a first threshold $C_1$. If the SOC of the battery is below $C_1$, the vehicle may enter an engine-only mode of operation where the M/G goes into generator operation. At step 108, a determination is made of the amount of torque, $T_{RECHARGE}$, which is required to turn the motor shaft to recharge the battery in the regenerative mode of operation. At step 110 torque loss $T_{LOSS}$ associated with other electrical losses of the vehicle is accounted for the given vehicle speed. These losses may be expressed as a torque, and include several inputs such as motor loss, DC/DC converter loss, and air conditioning compressor electric load among others.

While the vehicle is in an engine-on mode of operation and a low SOC below $C_1$, a forecast is generated at step 112 of engine torque $T_{ENGMAX}$ that is available over an upcoming predetermined time period, k seconds. Finally, the overall powertrain torque $T_{POWERTRAIN}$ is calculated at step 114 by subtracting each of the torque loads from the available engine torque. This calculation may be represented by the following equation:

$$T_{POWERTRAIN} = T_{ENGMAX} - T_{LOSS} - T_{RECHARGE}$$

The maximum available powertrain torque $T_{POWERTRAIN}$ which is sustainable over the upcoming k seconds is subsequently used in the transmission shift schedule. $T_{POWERTRAIN}$ is compared against an upshift threshold profile for a given vehicle speeds. If the available $T_{POWERTRAIN}$ is less than the acceleration demanded from the driver, an upshift from the present gear ratio to the next higher gear will be prevented to avoid rapid successive shifting within the upcoming k seconds.

If at step 106 the SOC is above threshold $C_1$, the M/G remains in a motor assist mode of operation where the motor contributes to the overall powertrain motive torque. At step 116 a forecast is generated of energy available from the traction battery over the upcoming predetermined time, k seconds. Similar to above, other electrical losses $T_{LOSS}$ of the vehicle are accounted for at step 118 for the given vehicle speed. In the motor assist mode $T_{LOSS}$ detracts from the torque output by the M/G. At step 120 the maximum torque possible motor torque output $T_{MOTORMAX}$ determined.

Because the motor torque output may be limited by electrical power limits or by the capabilities of the motor itself, a determination is made at step 122 of the limiting factor for motor torque output. Based which limitation is operative, a calculation is made of the available motor torque $T_{MOTORCALC}$ which is sustainable over the upcoming k seconds. If available electrical power is the limiting factor, the motor torque is determined at step 124 based on the battery power and electrical losses. Similar to above, at step 126 the engine torque $T_{ENGMAX}$ is determined that is available over the upcoming k seconds.

The overall powertrain torque $T_{POWERTRAIN}$ is calculated at 128 by adding each of the torque inputs from the available engine, as well as the motor. The calculation may be represented by the following equation:

$$T_{POWERTRAIN} = T_{ENGMAX} + T_{MOTORCALC}$$

If the limiting factor of the motor torque output is based on motor capability at step 122, the available sustainable motor torque $T_{MOTORCALC}$ calculated at step 130 may be the maximum specified motor output, less the torque associated with electric losses $T_{LOSS}$. Similar to above, at step 132 the engine torque $T_{ENGMAX}$ is determined that is available over the upcoming k seconds. Finally the overall powertrain torque $T_{POWERTRAIN}$ used for shift scheduling is calculated at step 134 by adding each of the torque inputs from the available engine, as well as the motor.

Figure 3:
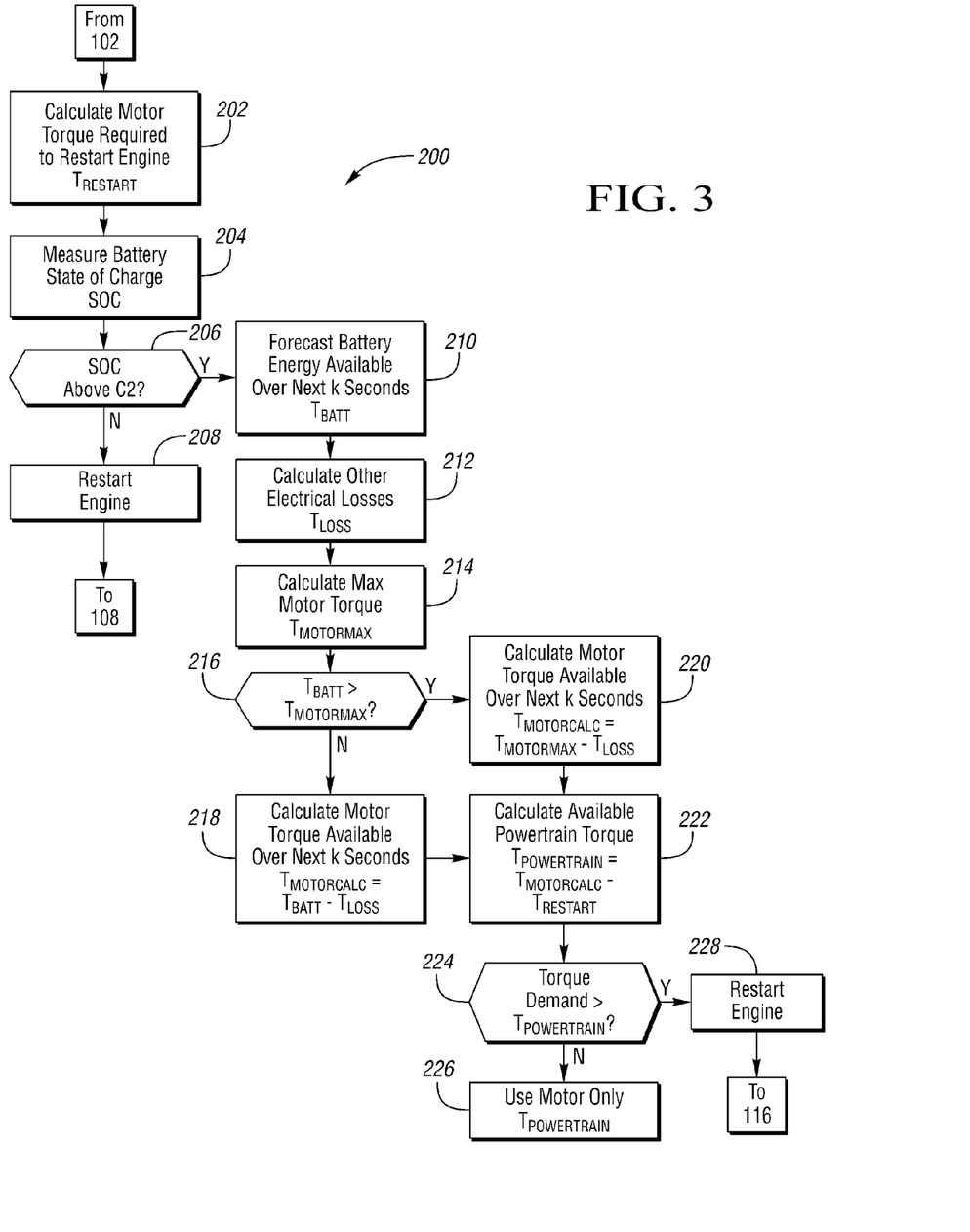
FIG. 3 is a flowchart corresponding to a method of forecasting sustainable powertrain torque in an engine-off mode of operation.

At step 102 if the vehicle is in an engine-off mode of operation, the algorithm diverts to method 200 shown in FIG. 3. At step 202 an amount of torque required to restart the engine $T_{RESTART}$ is calculated. At step 204 the state of charge of the battery SOC is measured. At step 206 the SOC level is compared to a second threshold $C_2$, which may be a critical threshold that is lower than the recharge threshold $C_1$. If the SOC is less than $C_2$, the engine is restarted at step 208. At this point the vehicle has returned to engine-on operation, and therefore returns to a portion of the routine of method 100. For example, once the engine is restarted, the routine may pick up at step 108.

If the SOC is above $C_2$ at step 206, the vehicle may remain in an engine-off mode. At step 210 a forecast is generated of energy available from the traction battery over the upcoming predetermined time, k seconds. Similar to above, other electrical losses $T_{LOSS}$ of the vehicle are accounted for at step 212 for the given vehicle speed. In any mode of operation where the electric motor is active to propel the vehicle, $T_{LOSS}$ may detract from the torque output by the motor. At step 214, the maximum torque possible motor torque output $T_{MOTORMAX}$ determined.

As discussed above relative to hybrid motor assist mode, the motor output may be limited by either the power available from the battery, or by the torque capability of the motor itself at a given speed. At step 216, the limiting factor of torque output of the motor is determined. If there is more than sufficient battery power available, the motor torque output may be at the full capacity of the motor. In this case, at step 220 the motor torque which is available over the upcoming k seconds, $T_{MOTORCALC}$, may be determined. Alternatively, if the power available from the battery is the limiting factor, the motor torque $T_{MOTORCALC}$ is calculated by using the battery energy calculated at step 210 and deducting torque loss $T_{LOSS}$ due to electrical losses.

Accordingly, the overall powertrain torque is calculated at step 222 by subtracting the engine restart torque $T_{RESTART}$, and may be represented by the following equation:

$$T_{POWERTRAIN} = T_{MOTORCALC} - T_{RESTART}$$

At step 224 $T_{POWERTRAIN}$ is compared to the torque demanded by the driver as a result of acceleration inputs. If the available powertrain torque $T_{POWERTRAIN}$ is adequate to satisfy torque demand, the vehicle may remain in engine-off mode at step 226 and use only the motor to propel the vehicle.

If at step 224 $T_{POWERTRAIN}$ is less than driver demand, the engine may be restarted at step 228. Once the engine is restarted, the control strategy may divert back to the hybrid mode of operation. For example, the method may resume at step 116 as outlined above. Using the above technique of forecast adjustment, method 200 effectively employs a schedule of upshift thresholds that differs between engine-on and engine-off modes of operation.

Figure 4:
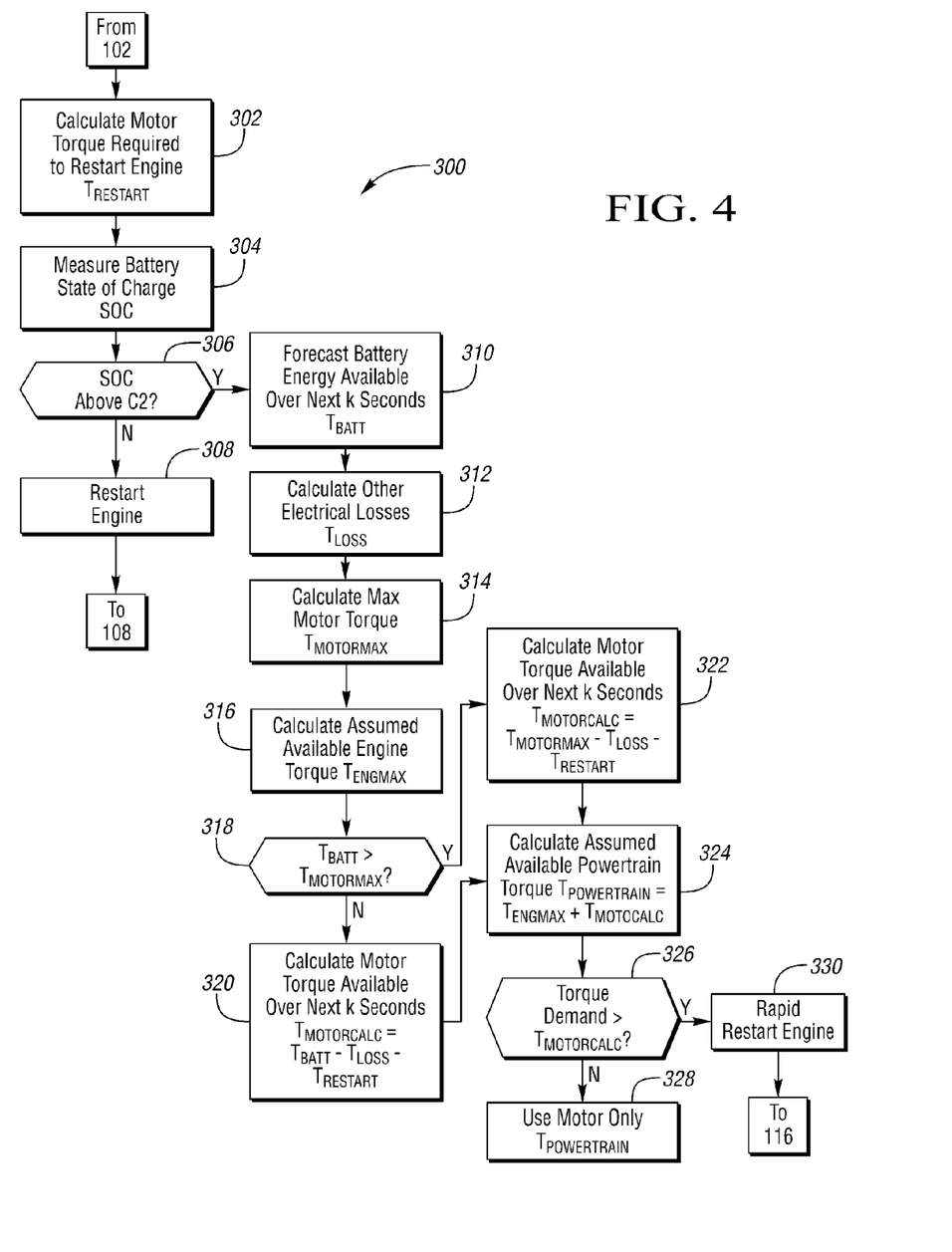
FIG. 4 is a flowchart corresponding to an alternative method of forecasting sustainable powertrain torque in an engine-on mode of operation.

An alternative method 300 may be available to manage engine-off operation. In contrast to previous embodiments, a single schedule of upshift thresholds may be employed for both engine-on and engine-off modes of operation. By way of example, method 300 may assume that engine torque is always available, and employ a rapid engine restart only when driver demand exceeds the available motor torque. The rapid restart may be invoked prior to the motor achieving its peak torque in an attempt to provide more seamless vehicle acceleration.

At step 102 if the vehicle is in an engine-off mode of operation, the algorithm may divert to alternative method 300 shown in FIG. 4. At step 302 an amount of torque required to rapidly restart the engine $T_{RESTART}$ is calculated. At step 304 the state of charge of the battery SOC is measured. At step 306 the SOC level is compared to a second threshold $C_2$. If the SOC is less than $C_2$, the engine is restarted at step 308. At this point the vehicle is in an engine-on mode of operation, and therefore returns to a portion of the routine of method 100. For example, once the engine is restarted, the routine may pick up at step 108.

If the SOC is above $C_2$ at step 306, the vehicle may remain in engine-off mode. At step 310 a forecast is generated of energy available from the traction battery over the upcoming predetermined time, k seconds. Similar to above, other electrical losses $T_{LOSS}$ of the vehicle are accounted for at step 312 for the given vehicle speed. In any mode of operation where the electric motor is active to propel the vehicle, $T_{LOSS}$ may detract from the torque output by the motor. At step 314, the maximum torque possible motor torque output $T_{MOTORMAX}$ determined.

In alternate method 300, a forecast is generated at step 316 of an assumed engine torque $T_{ENGMAX}$ which is available over an upcoming predetermined time period, k seconds. Although the engine is disabled, the assumed engine torque may still go into the calculation of available powertrain torque over the upcoming time period.

At step 318, the limiting factor of torque output of the motor is determined. If there is more than sufficient battery power available, the motor torque output may be at the full capacity of the motor. In this case, at step 322 the motor torque which is available over the upcoming k seconds, $T_{MOTORCALC}$, may be determined. Alternatively, if the power available from the battery is the limiting factor, the motor torque $T_{MOTORCALC}$ is calculated by using the battery energy calculated at step 310, and deducting both of the torque loss $T_{LOSS}$ due to electrical losses, as well as the torque required to perform a rapid restart of the engine, $T_{RESTART}$.

Accordingly, the overall powertrain torque is calculated at step 324 by summing the available engine and motor torques, and may be represented by the following equation:

$$T_{POWERTRAIN} = T_{ENGMAX} + T_{MOTORCALC}$$

At step 326 $T_{POWERTRAIN}$ is compared to the torque demanded by the driver as a result of acceleration inputs. If the available motor torque $T_{MOTORCALC}$ is sufficient to itself satisfy torque demand, the vehicle may remain in engine-off mode at step 328 and use only the motor to propel the vehicle. However if the torque demanded by the driver exceeds the motor portion of the powertrain available torque at step 326, a rapid engine restart may be invoked at step 330. As a result the vehicle returns to the engine-on mode of operation and may reenter method 100. For example the method may pick up at step 116.

Figure 5:
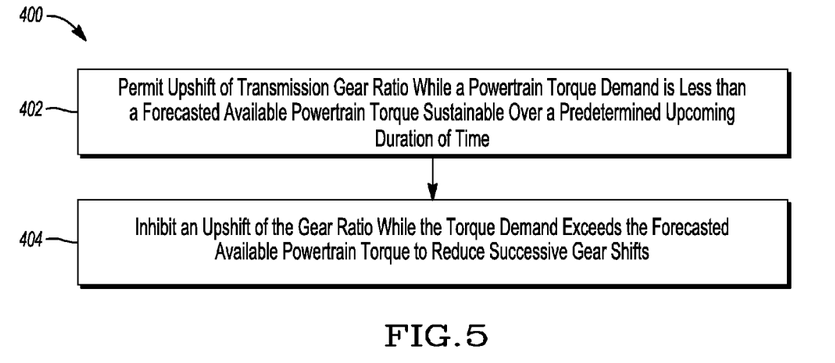
FIG. 5 is a flowchart corresponding to a method for a vehicle.

FIG. 5 depicts a method 400 for a vehicle. At step 402, an upshift of a transmission gear ratio is permitted while a powertrain torque demand is less than a forecasted available powertrain torque sustainable over a predetermined upcoming duration of time. And at step 404, an upshift of the gear ratio is inhibited while the torque demand exceeds the forecasted available powertrain torque to reduce successive gear shifts.

Figure 6:
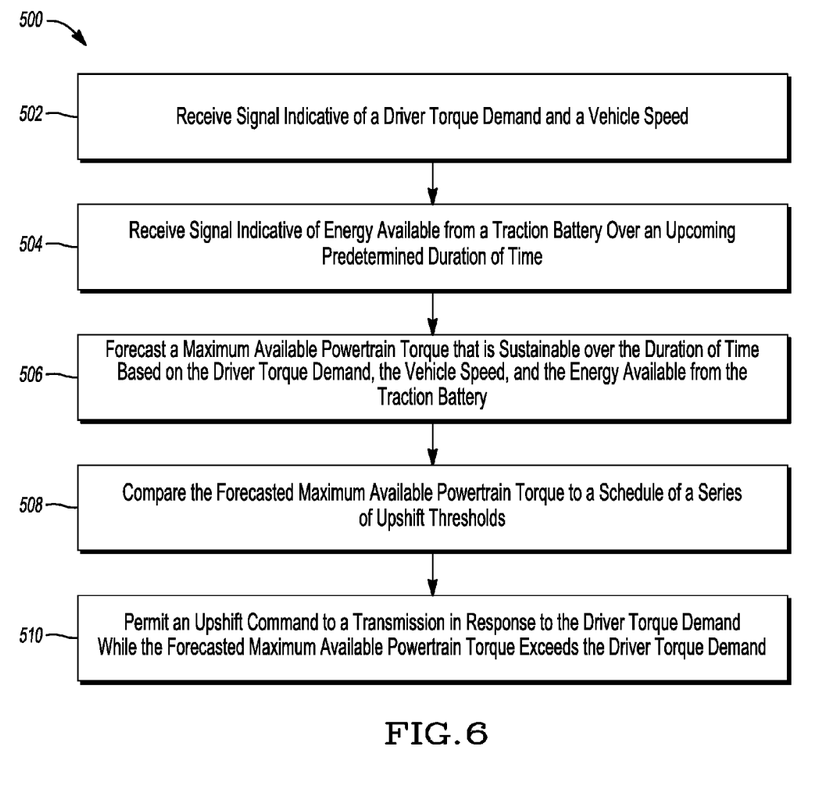
FIG. 6 is a flowchart corresponding to a method of scheduling hybrid vehicle transmission gear shifts.

FIG. 6 depicts a method 500 of scheduling hybrid vehicle transmission gear shifts. At step 502, a signal indicative of a driver torque demand and a vehicle speed is received. At step 504, a signal indicative of energy available from a traction battery over an upcoming predetermined duration of time is received. At step 506, a maximum available powertrain torque that is sustainable over the duration of time based on the driver torque demand, the vehicle speed, and the energy available from the traction battery is forecasted. At step 508, the forecasted maximum available powertrain torque is compared to a schedule of a series of upshift thresholds. And at step 510, an upshift command to a transmission is permitted in response to the driver torque demand while the forecasted maximum available powertrain torque exceeds the driver torque demand.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of scheduling hybrid vehicle transmission gear shifts comprising:
   receiving signals indicative of a driver torque demand and a vehicle speed;
   receiving a signal indicative of energy available from a traction battery over an upcoming selectable duration of time that is specified by request during vehicle operation;
   forecasting a maximum available powertrain torque that is sustainable over the selectable duration of time based on the driver torque demand, the vehicle speed, and the energy available from the traction battery;
   comparing the forecasted maximum available powertrain torque to a schedule of a series of upshift thresholds; and
   permitting an upshift command to a transmission in response to the driver torque demand while the forecasted maximum available powertrain torque exceeds the driver torque demand.

2. The method of claim 1 further comprising, in response to operating in an engine-off mode, reducing the forecasted maximum available powertrain torque by an amount sufficient to restart an engine.

3. The method of claim 1 wherein the energy available from the traction battery is a cumulative amount over the selectable duration of time, and further comprising subtracting energy associated with a vehicle electrical load from the cumulative amount.

4. The method of claim 1 further comprising, in response to a state of charge of the traction battery being less than a first threshold, reducing the forecasted maximum available powertrain torque by an amount sufficient to recharge the battery with a torque output from an engine.

5. The method of claim 1 further comprising storing a unique schedule of series of upshift thresholds for each of an engine-on mode and an engine-off mode.

6. The method of claim 1 wherein a single schedule of upshift thresholds accommodates both of an engine-on and an engine-off mode of operation, and in response to the driver torque demand exceeding an available motor torque while in engine-off mode, initiating a rapid restart of an engine to provide a powertrain torque assist.

7. A hybrid-electric vehicle comprising:
a powertrain including a battery-powered motor, an internal combustion engine, and a transmission; and
a controller programmed to permit an upshift command for the transmission in response to an acceleration demand while a forecasted available powertrain torque available over a selectable upcoming period of time, that is specified by request during vehicle operation, exceeds a stored upshift threshold to reduce an overall number of gear ratio shifts.

8. The vehicle of claim 7 wherein the forecasted available powertrain torque is based on at least one of a forecasted power available from a battery and a forecasted battery state of charge over the selectable upcoming period of time.

9. The vehicle of claim 7 wherein the controller is further programmed to, in response to a state of charge of a battery being less than a first threshold, reduce the forecasted available powertrain torque by an amount sufficient to provide a recharge to the battery.

10. The vehicle of claim 7 wherein the controller is further programmed to, in response to a state of charge of a battery being greater than a first threshold, increase the forecasted available powertrain torque by an amount of torque assist available from the motor, causing a discharge to the battery.

11. The vehicle of claim 7 wherein the controller is further programmed to reduce the forecasted available powertrain torque by an amount sufficient to restart the engine while the powertrain is operating in an engine-off traction mode.

12. The vehicle of claim 7 wherein a single schedule of upshift thresholds accommodates both engine-on and engine-off modes of operation, and in response to the acceleration demand exceeding an available torque from the motor while in an engine-off traction mode, initiating a rapid restart of the engine to provide a powertrain torque assist.

* * * * *